United States Patent
Choi et al.

(10) Patent No.: US 6,917,927 B2
(45) Date of Patent: Jul. 12, 2005

(54) METHOD FOR INDEXING FEATURE VECTOR DATA SPACE

(75) Inventors: Yang-lim Choi, Suwon (KR); B. S. Manjunath, Santa Barbara, CA (US); Peng Wu, Mountain View, CA (US)

(73) Assignees: Samsung Electronics Co., Ltd., Kyungki-do (KR); The Regents of the University of California, Oakland, CA (US)

( * ) Notice: Subject to any disclaimer, the term of this patent is extended or adjusted under 35 U.S.C. 154(b) by 396 days.

(21) Appl. No.: 09/783,135

(22) Filed: Feb. 15, 2001

(65) Prior Publication Data

US 2002/0040367 A1 Apr. 4, 2002

Related U.S. Application Data

(60) Provisional application No. 60/226,586, filed on Aug. 21, 2000.

(30) Foreign Application Priority Data

Oct. 6, 2000 (KR) ......................................... 2000-58759

(51) Int. Cl.[7] ............................................. G06F 15/18
(52) U.S. Cl. .............................. 706/14; 706/46; 706/45
(58) Field of Search ............................... 706/14, 46, 45

(56) References Cited

U.S. PATENT DOCUMENTS

| 5,647,058 A | 7/1997 | Agrawal et al. | |
| 5,713,016 A | * 1/1998 | Hill ............................... | 707/5 |

FOREIGN PATENT DOCUMENTS

| JP | 7-134774 A | 5/1995 |
| JP | 2001-344553 | 12/2001 |
| WO | WO 97/48069 | 12/1997 |
| WO | WO 00/28441 A2 | 5/2000 |

OTHER PUBLICATIONS

Usama M. Fayyad: "Scaling Em (Expectation–Maximization) Clustering to Large Databases", Microsoft Research, Online!, Feb. 1999, XP002236781.
Chang Ey et al.: "Searching Near Relicas of Images Via Clustering", Proceedings of the Spie, Spie, Bellingham, VA, US, vol. 3846, Sep. 20, 1999, pp. 281–292, XP001018569.
Per Hedelin, Jan Skoglund:, "Vector Quantization Based on Guassian Mixture Models", IEEE Transactions and Audio Processing, Online!, vol. 8, No. 4, Jul. 2000, XP002236782.
Kidawara et. al., " Partial Match Query Processing using Vector Space Model and Tendency of Data Distribution", Journal of Information Processing, No. SIG 3 (T0D1), Feb., 1999, 11–23, vol. 40, Information Processing Society of Japan, Japan.

* cited by examiner

Primary Examiner—Anthony Knight
Assistant Examiner—Joseph P. Hirl
(74) Attorney, Agent, or Firm—Sughrue Mion, PLLC

(57) ABSTRACT

A method is provided for indexing feature vectors within feature vector data space which includes adaptively forming approximation of the feature vectors on the basis of statistical distribution of feature vector data within the feature vector data space. The method for indexing feature vector data space of the present invention efficiently indexes vector space having high-dimensionality in which generally feature vectors are not uniformly distributed. Also, the method for indexing feature vector data space has an advantage that indexing can be easily upgraded when new feature vector data is added.

15 Claims, 6 Drawing Sheets

FIG. 1
FIG. 2
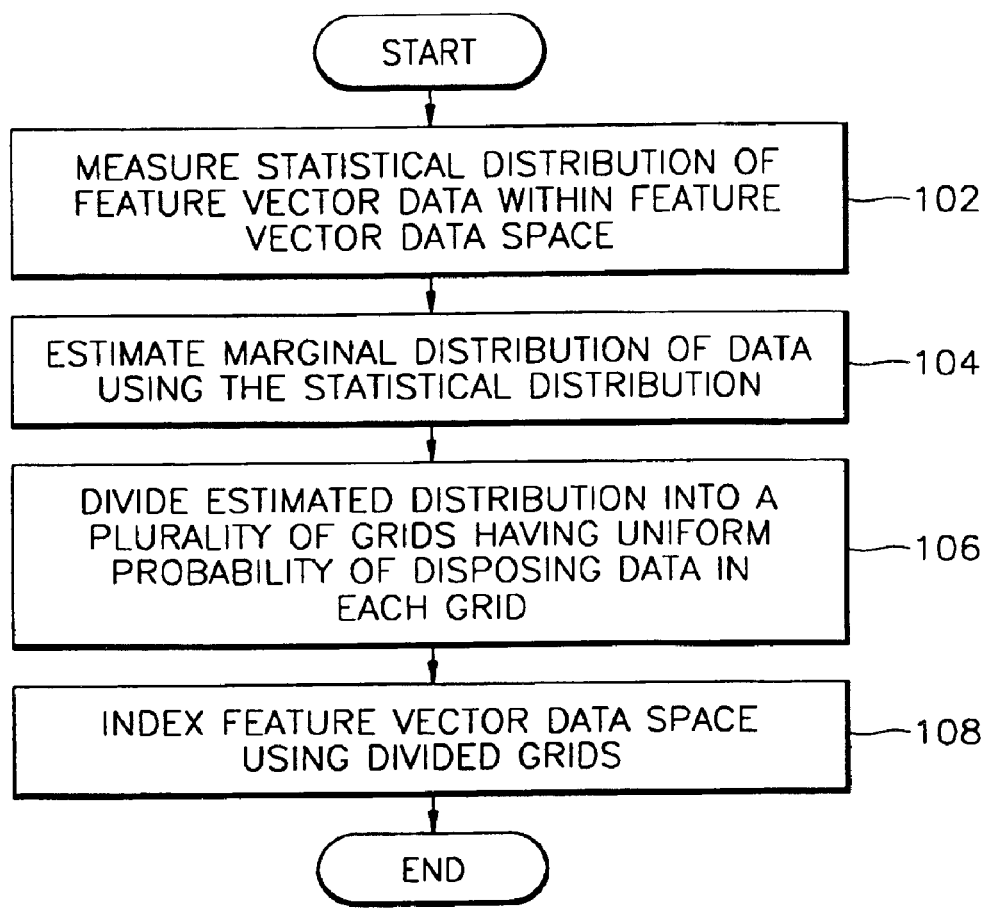
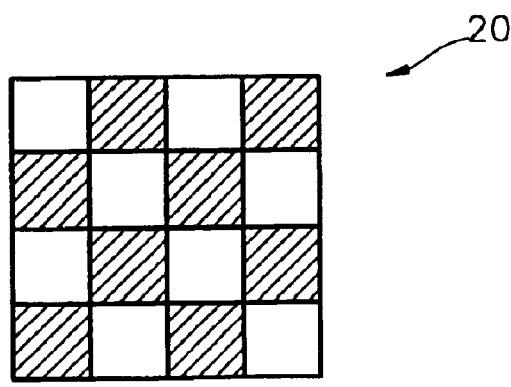

METHOD FOR INDEXING FEATURE VECTOR DATA SPACE

The present application claims the benefit under 35 U.S.C. § 119(e) of the filing date of U.S. Provisional Application No. 60/226,586, filed Aug. 21, 2000 and entitled "A Scabel and Adaptive Index Structure For Similarity Search in High Dimensions". The contents of this U.S. Provisional Application are incorporated herein by reference.

BACKGROUND OF THE INVENTION

1. Field of the Invention

The present invention relates to a method for indexing feature vector data space, and more particularly, to a method for indexing feature vector data space which efficiently performs indexing within the vector space having high-dimensionality in which feature vectors are not uniformly distributed.

The present application also claims the benefit under 35 U.S.C. § 119(a) of the filing date of Korean Patent Application No. 00-58759 which is incorporated herein by reference.

2. Description of the Related Art

High dimensionality of typical multimedia data descriptors pose challenging problems in designing efficient indexing schemes. Therefore, several new indexing structures have been proposed recently. One of the common assumptions made is that feature vectors in the high dimensional feature space are uniformly distributed within a vector space. However, many media descriptors, such as image texture descriptors, are not uniformly distributed. For example, in the case of a method for using well-known vector approximation (VA) files, the performance of the method depends on the uniform distribution of the feature vectors.

Generally, the method of the related art suffers because its performance abruptly drops when indexing the feature vector data within vector space having high-dimensionality, in which the feature vectors are not uniformly distributed.

SUMMARY OF THE INVENTION

To solve the above problems, it is an object of the present invention to provide a method for indexing feature vector data space which performs indexing efficiently within vector space having high-dimensionality, in which the feature vectors are not uniformly distributed.

To achieve the above objective according to the present invention, there is provided a method for indexing feature vector data space including a step of: (a) indexing feature vector space by adaptively approximating feature vectors on the basis of statistical distribution of feature vector data in the feature vector data space.

Step (a) further includes the steps of: (a-1) measuring the statistical distribution of the feature vector data in the feature vector data space; (a-2) estimating marginal distribution of the data using the statical distribution; (a-3) dividing the estimated distribution into a plurality of grids in which a distribution of disposing the data in each grid becomes uniform; and (a-4) indexing the feature vector data space using the divided grids.

Prior to step (a-4), it is preferable to further include a step of updating the grids on the basis of the previous probability distribution function and the updated probability distribution function, when new data is entered.

Also, step (a-4) preferably further includes a step of indexing using vector approximation (VA) files.

In a preferred embodiment, the number of the plurality of grids is determined by the number of bits assigned to the dimension.

Step (a-2) further includes the steps of: (a-2-1) defining the probability distribution function using a weighted sum of the predetermined distribution function; and (a-2-2) obtaining the estimated probability distribution function by estimating the predetermined parameters using the probability distribution function defined in the step (a-2-1).

Step (a-2-2) further includes a step of obtaining an estimated probability distribution function by estimating parameters using all N predetermined data, wherein N is a positive integer, for several iterations on the basis of the expectation-maximization algorithm and using the probability distribution function defined in the step (a-2-1).

Also, preferably, the predetermined distribution function is a Gaussian function.

In a preferred embodiment, the probability distribution function of step (a-2-1) is a one-dimensional signal, p(x), wherein $$p(x) = \sum_{j=1}^{N} p(x|j) P_{(j)},$$

and wherein p(x|j) is defined as $$p(x|j) = \frac{1}{\sqrt{2\pi\sigma_j^2}} \exp\left\{-\frac{(x-\mu_j)^2}{2\sigma_j^2}\right\},$$

wherein coefficient P(j) is a mixing parameter that satisfies certain criterion.

In another preferred embodiment, the estimated probability function of step (a-2-2) is obtained by finding $\Phi_j$, j=1, . . . ,M. which maximizes $$\Phi(\Phi_1, \ldots, \Phi_M) = \prod_{l=1}^{N} p(v[l]|(\Phi_1, \ldots, \Phi_M)),$$

wherein parameters v[l], l=1, . . . N, is a given data set.

In a further embodiment, the estimated parameters of step (a-2-2) are updated according to $$\mu_j^{t+1} = \frac{\sum_{l=1}^{N} p(j|v[l])^t v[l]}{\left(\sum_{l=1}^{N} p(j|v[l])\right)^t},$$

$$(\sigma_j^2)^{t+1} = \frac{\sum_{l=1}^{N} (p(j|v[l]))^t (v[l] - \mu_j^t)^2}{\left(\sum_{l=1}^{N} p(j|v[l])\right)^t}, \text{ and}$$

$$\left(P(j)^{t+1} = \frac{1}{N} \sum_{l=1}^{N} p(j|v[l])\right)^t,$$

wherein t is a positive integer representing the number of iteration.

Also, preferably, the estimated parameters set of step (a-2-2) used N data v[l], given as $\{P(j)^N, \mu_j^N, (\sigma_j^2)^N\}$, and the updated parameter set for new data v[N+1] coming in, is calculated using the following equations:

$$\mu_j^{N+1} = \mu_j^N + \theta_j^{N+1}(v[N+1] - \mu_j^N),$$

$$(\sigma_j^2)^{N+1} = (\sigma_j^2)^N + \theta_j^{N+1}[(v[N+1] - \mu_j^N)^2 - (\sigma_j^2)^N],$$

$$P(j)^{N+1} = P(j)^N + \frac{1}{N+1}(p(j|v[N+1] - P(j)^N), \text{ and}$$

$$(\theta_j^{N+1})^{-1} = \frac{p(j|v[N])}{p(j|[N+1])}(\theta_j^N)^{-1} + 1.$$

Step (a-2-2) also further includes the steps of: measuring changes of the probability function which is defined as $$\rho = \frac{\int (\hat{p}_{old}(x) - \hat{p}_{new}(x))^2 dx}{\int (p_{old}(x))^2 dx}$$

for each dimension, wherein the previous probability distribution function is $\hat{p}_{old}(x)$ and the updated probability distribution function is $\hat{p}_{new}(x)$, and updating an approximation for the dimension if $\rho$ is larger than a predetermined threshold value.

In a preferred embodiment, step (a-3) also includes a step of dividing the probability distribution function into the plurality of grids to make areas covered by each grid equal, wherein the plurality of grids have boundary points defined by c[l], l=0, . . . ,$2^b$, where b is a number of bits allocated, and wherein the boundary points satisfy a criterion, $$\int_{c[l]}^{c[l+1]} \hat{p}(x) dx = \frac{1}{2^b} \int_{c[0]}^{c[2^b]} \hat{p}(x) dx,$$

and wherein the estimated probability distribution function is $\hat{p}(x)$.

BRIEF DESCRIPTION OF THE DRAWINGS

The above objective(s) and advantages of the present invention will become more apparent by describing in detail a preferred embodiment thereof with reference to the attached drawings in which:

FIG. 1 is a flowchart showing the main steps of an indexing method according to the preferred embodiments of the present invention;

FIG. 2 illustrates a case where data joint distribution is still not uniform but agglomerated even though the marginal distribution of the data is uniform in each dimension;

DETAILED DESCRIPTION OF THE INVENTION

Figure 3A:
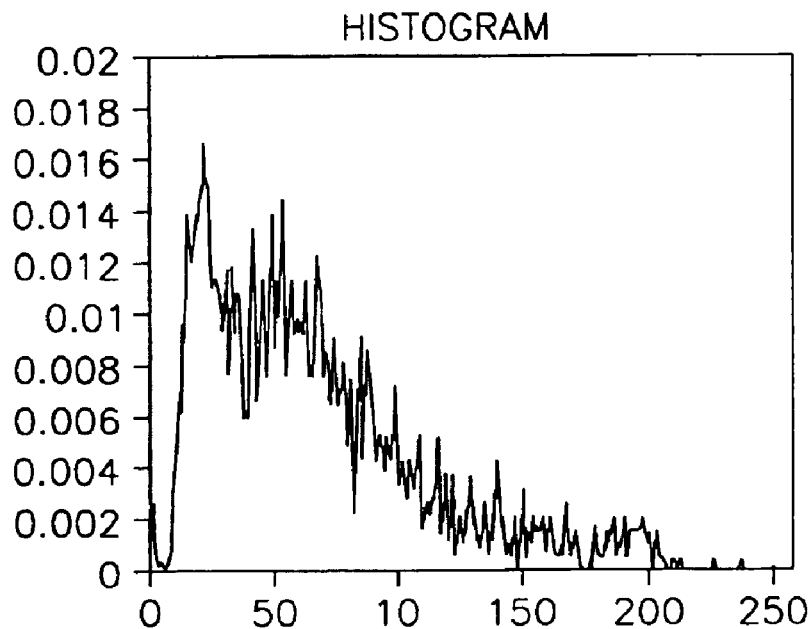
FIG. 3A is a histogram showing the distribution of feature vector data within the feature vector data space.

Hereinafter, preferred embodiments of the present invention will be described with reference to the appended drawings.

FIG. 1 is a flowchart illustrating the main steps of an indexing method according to a preferred embodiment of the present invention. According to the present invention, vector approximation (VA) files are adaptively formed on the basis of statistical distributions of feature vector data within the feature vector data space.

That is, since densely distributed cells can deteriorate the performance of indexing, the approximation of the feature vectors is adaptively formed according to statistical features of the data in the present invention. To do this according to the indexing method as shown in FIG. 1, statistical distributions of the feature vector data are measured within the feature vector data space (step 102). Then, marginal distribution is estimated using the statistical distribution (step 104). Next, estimated marginal distributions are divided into a plurality of grids in which a probability of disposing the data in each grid becomes uniform (step 106) and wherein the number of grids is determined by the number of bits assigned to the dimension. Then, the feature vector data space is indexed using the divided grids (step 108). Step 108 can be performed on the basis of the indexing method using well known vector approximation (VA) files.

The approximation formed by the above method reduces the possibility of having densely distributed cells. Therefore, the performance of indexing is enhanced. It should be noted, however, that the marginal distributions of the data can only capture partial information of high dimensional distributions.

FIG. 2 illustrates a case where the point distribution of data is agglomerated rather than uniform, even though the marginal distributions of the data are uniform in each dimension. With reference to FIG. 2, the marginal distributions of the data are uniform in each dimension within the entire feature vector data space 20. Considering, however, that the correlation of data on different dimensions decreases with an increase of data's dimensionality and the attributes of image/video database, capturing the statistical properties of the high dimensional data can still be an effective method for estimating the marginal distributions of the data.

Hereinafter, techniques for realizing a method of the present invention will be described in greater detail. First, a probability distribution function is denoted by $p_j(x)$ for data on dimension i. Following the assumption that data on each dimension are independent of each other, the algorithm described hereinafter can be applied to each dimension independently.

Also, as previously described, the data distribution is not uniform. In fact, the probability distribution function of data may be irregular or incapable of being modeled by a well-defined function such as, for example, the Gaussian function. To overcome this deficiency, the present invention provides a probability distribution function of one-dimensional data that is modeled using the Gaussian mixture function in order to endure a change of the data distribution.

First, it is assumed that a probability distribution function of a one-dimensional signal, p(x) is defined as follows:

$$p(x) = \sum_{j=1}^{N} p(x|j) P(j) \qquad (1)$$

Here, the p(x|j) is defined as follows.

$$P(x|j) = \frac{1}{\sqrt{2\pi\sigma_j^2}} \exp\left\{-\frac{(x-\mu_j)^2}{2\sigma_j^2}\right\} \qquad (2)$$

The coefficients P(j) are mixing parameters, which satisfy the criteria $0 \leq P(j) \leq 1$ and the following formula.

$$\sum_{j=1}^{M} P(j) = 1 \qquad (3)$$

Thus, in this embodiment, the probability distribution function is defined using a weighted sum of the Gaussain function. Then, the task of estimating the probability distribution function is converted to an exercise of parameter estimation for the parameters $\phi_j = \{P(j), \mu_j, \sigma_j^2\}$, for $j=1, \ldots$ M.

A maximum likelihood based method is used for the parameter estimation using the idea that the optimal estimation of parameters should result in a probability distribution function which most likely would give rise to given data. In this case, we want to find $\phi_j$, $j=1, \ldots$ M to maximize $$\Phi(\Phi_1, \ldots, \Phi_M) = \prod_{l=0}^{N} p(v[l]|(\Phi_1, \ldots, \Phi_M)) \qquad (4)$$

where v[l], l=1, . . . N, are the given data set.

The above parameters are obtained using an expectation-maximization (EM) algorithm. According to the EM algorithm, N predetermined data are inputted for the estimation, and parameters are estimated iteratively using all the N given data in each iteration.

The following equations are used to update the estimated parameters, where t denotes the iteration number, $$\mu_j^{t+1} = \frac{\sum_{l=1}^{N} p(j|v[l])^t v[l]}{\sum_{l=1}^{N} p(j|v[l])^t} \qquad (5)$$

$$(\sigma_j^2)^{t+1} = \frac{\sum_{l=1}^{N} p(j|v[l])^t (v[l] - \mu_j^t)^2}{\sum_{l=1}^{N} p(j|v[l])^t} \qquad (6)$$

$$P(j)^{t+1} = \frac{1}{N} \sum_{l=1}^{N} p(j|v[l])^t \qquad (7)$$

However, the above formulas may cause a crash of estimation if the data's distribution has a singular value which can not be grouped with other values as a part of a Gaussian function.

When this is the case, in order to capture a value accurately, $\mu$ must be allowed to approach the singular value and the corresponding $\sigma^2$ must converge to 0. To avoid this singularity problem, a very small value is set as a lower bound for an estimated variance.

Figure 3B:
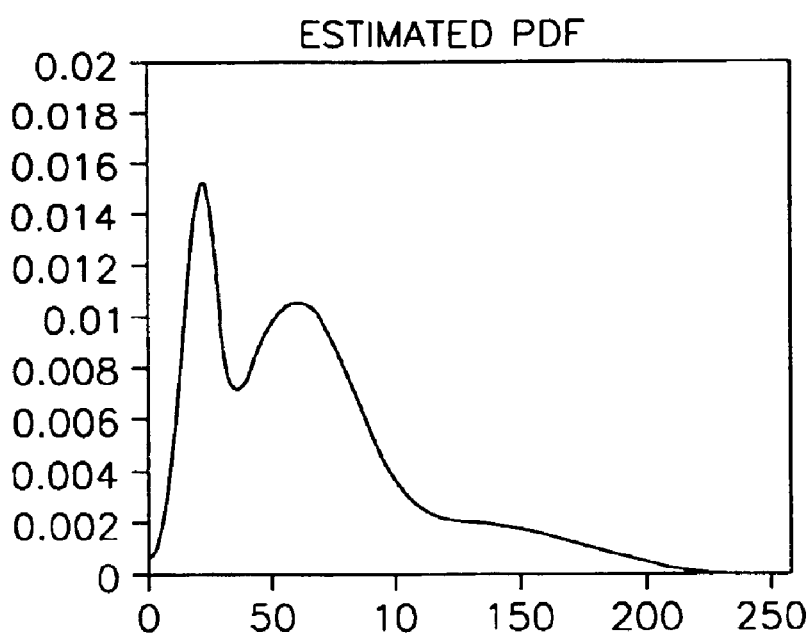
FIG. 3B is a graph showing the probability distribution function estimate on the histogram.

In order to explain the efficiency of using the EM algorithm for estimating parameters of the Gaussian mixture function, a histogram illustrating a distribution of feature vector data within the feature vector data space in provided in FIG. 3A, and a graph of a probability distribution function estimation based on the histogram is illustrated in FIG. 3B.

As shown in FIGS. 3A and 3B, a data's probability distribution function can be modeled well using the Gaussian mixtures as the modeling tool and the EM algorithm to estimate the parameters, even though the data's distribution is irregular and cannot be modeled by some simple form function.

The parameters may also be updated by on-line estimation using the formulas of equations 5, 6, and 7 if N predetermined data are available. In the case of a large database, N is generally only a small portion of the total number of elements in the database.

In realistic database applications, an estimation is required to be updated at a prescribed point. For example, there may be a case where a larger portion of data is required for a better estimation. Alternatively, when the database is non-static, the probability distribution function must be re-estimated because the statistical characteristics of data change. In any case, a "memory" of the previous estimation is not required to be totally erased.

In view of the parameter estimation, a strategy must be provided for tracking the change of the estimated probability distribution function when a data set is changing. For this purpose, an algorithm is provided in the present invention which can sequentially update the estimation.

Given that $\{P(j)^N, \mu_j^N, (\sigma_j^2)^N\}$ is the parameter set estimated using N data v[l], the updated parameter set, when there is new data v[N+1] coming in, is calculated as follows.

$$\mu_j^{N+1} = \mu_j^N + \theta_j^{N+1}(v[N+1] - \mu_j^N) \qquad (8)$$

$$(\sigma_j^2)^{N+1} = (\sigma_j^2)^N + \theta_j^{N+1}[(v[N+1] - \mu_j^N)^2 - (\sigma_j^2)^N] \qquad (9)$$

$$P(j)^{N+1} = P(j)^N + \frac{1}{N+1}(P(j|v[N+1]) - P(j)^N) \qquad (10)$$

In the formulas 8 and 9, $$(\theta_j^{N+1})^{-1} = \frac{P(j|v[N])}{P(j|v[N+1])}(\theta_j^N)^{-1} + 1 \qquad (11)$$

In order to evaluate the tracking performance using on-line estimation, experimentation was performed on a synthetic data set. The feature vector values of data sets are illustrated in FIG. 4A and include 5,000 elements.

Figure 4A:
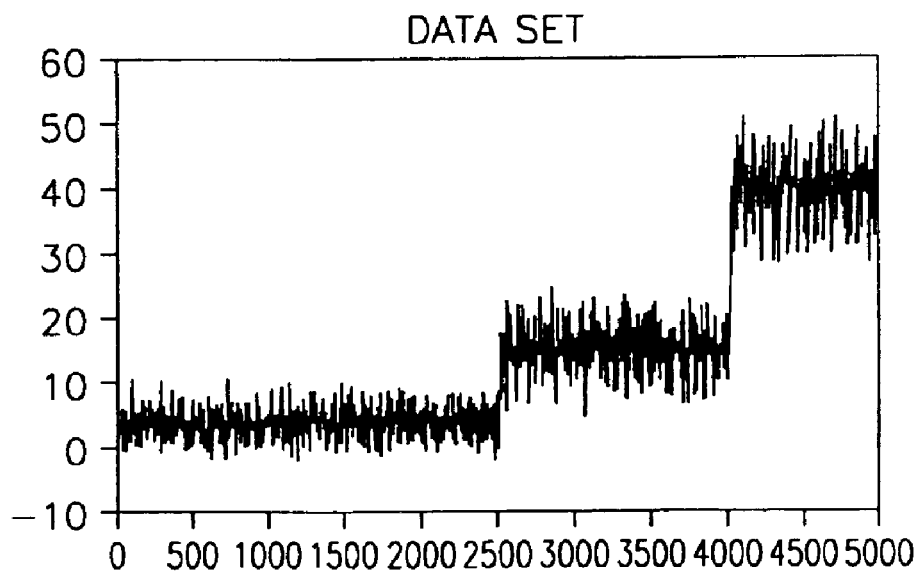
FIG. 4A is a graph showing feature vector values of the data sets.
Figure 4B:
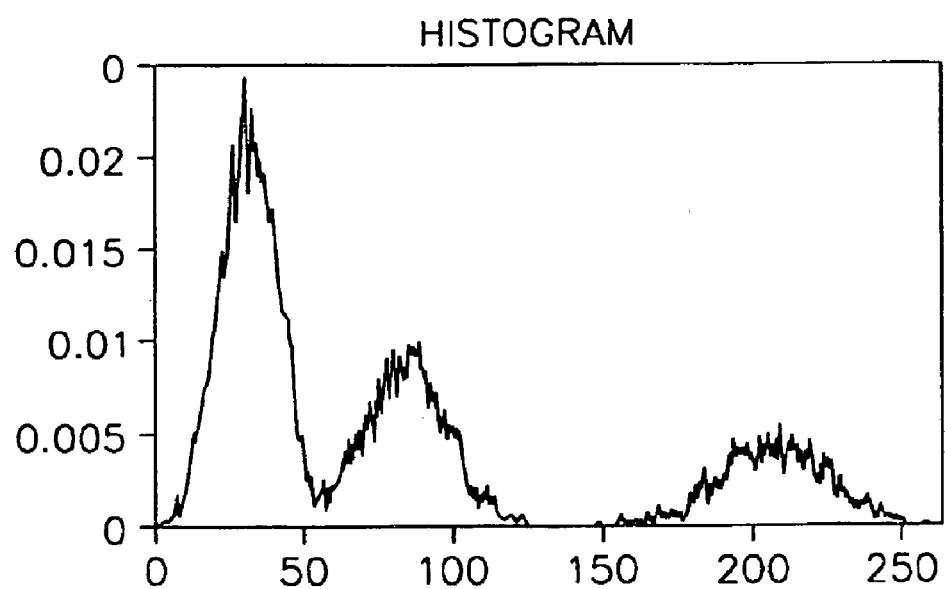
FIG. 4B is a graph showing the results of calculating a histogram of the data sets of FIG. 4A.

FIG. 4B shows the results of calculating histograms for the data sets of FIG. 4A. Each individual element is sequentially added for the estimation. Then, the parameters are calculated using formulas 8, 9 and 10. Next, the probability distribution function is reconstructed from the estimated parameters, when a certain number of elements are used for the estimation.

Figure 4C:
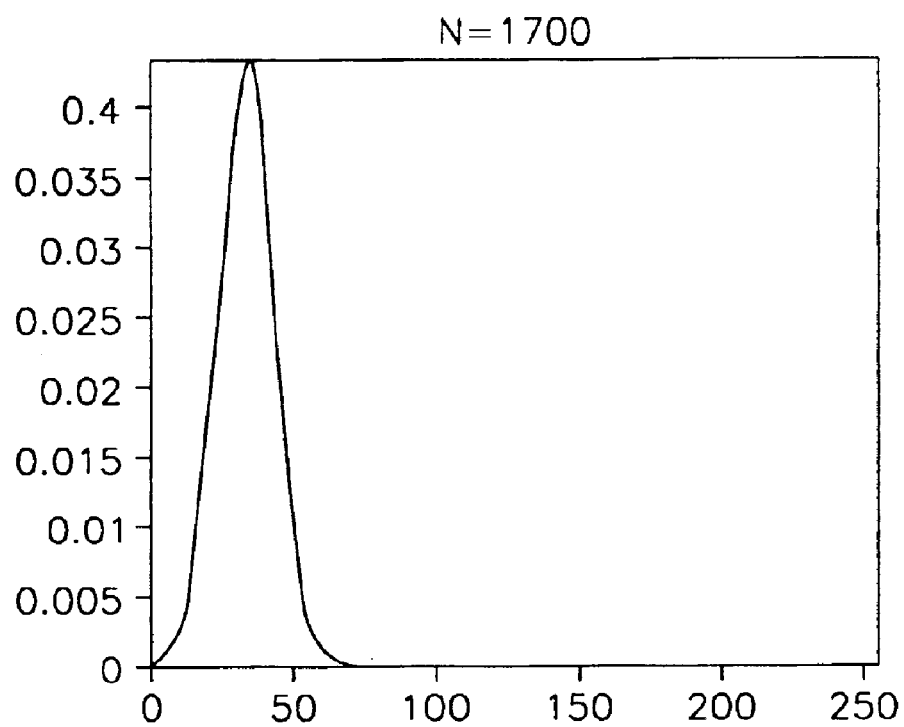
FIGS. 4C, 4D, and 4E are graphs showing the estimated probability distribution functions when the number of elements used for the estimation is 1700, 3400, and 5000, respectively.
Figure 4D:
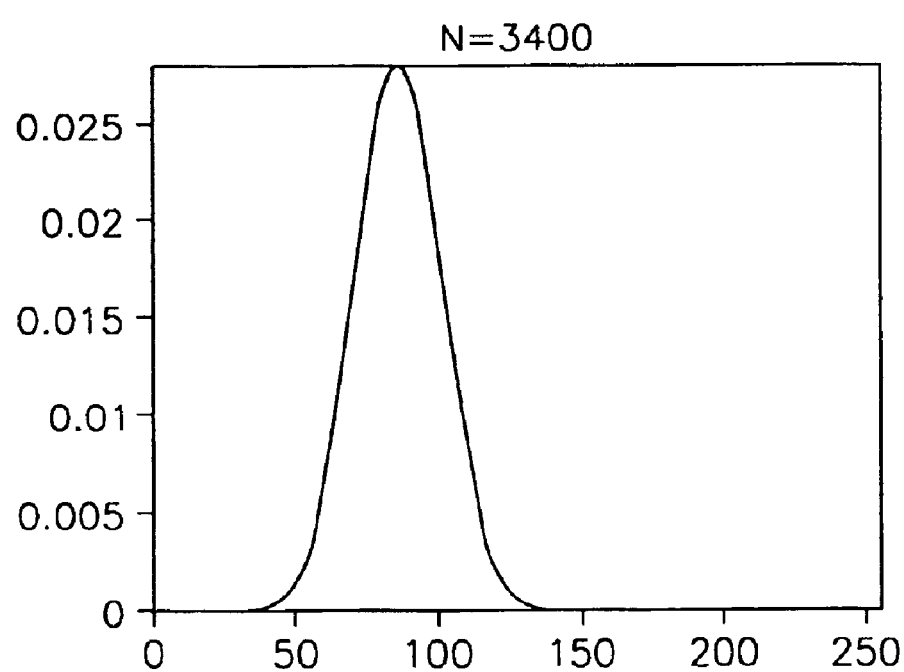
Figure 4E:
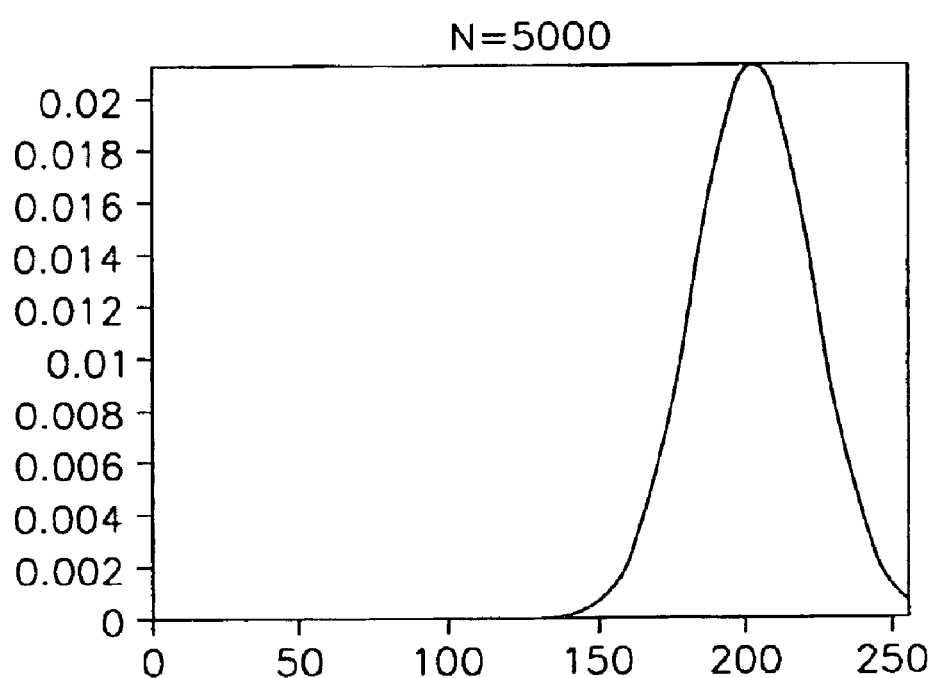

FIGS. 4C, 4D, and 4E show the estimated probability distribution functions when the number of elements used for the estimation is 1700, 3400, and 5000, respectively. Referring to FIGS. 4C, 4D, and 4E, when the distribution of input data changes, it is shown that the on-line estimation tracks very well. It is noted that the effectiveness of the on-line estimation partially depends on the method of choosing data as an input.

For example, if one wants to estimate the probability distribution function of the data as shown in FIG. 4A, but the data is chosen in the same order as they are indexed, then one can only have the estimated probability distribution function shown in FIG. 4E. Thus, the data should ideally be chosen unbiased.

Next, nonlinear quantization is applied to segment a probability distribution function into a plurality of grids to make areas covered by each grid equal, wherein the estimated probability distribution function is called $\hat{p}(x)$. The boundary points are indicated by $c[l]$, $l=0, \ldots, 2^b$, where b is the number of bits allocated, wherein the boundary points should satisfy the following criterion:

$$\int_{c[l]}^{c[l+1]} \hat{p}(x) dx = \frac{1}{2^b} \int_{c[0]}^{c[2^b]} \hat{p}(x) dx \quad (12)$$

Using this criterion, it is possible to determine boundary points from one pass scan of the estimated probability distribution function. For example, the boundary points of each dimension are determined by agglomerating all the N data into $2^b$ clusters. In addition to being computationally efficient for determining boundary points, equation 12 also avoids dependency on distance measurements.

According to the above method, a probability distribution function is able to be updated. This feature is very important for maintaining the indexing of a non static database. That is, every time a previous estimation does not fit with the updated estimation, the approximation also needs to be updated.

For this reason, a measure is required to decide when to update the approximation based on the change of probability distribution function estimation. As a result of the parallel scheme of utilizing the probability distribution function to construct the approximation, the measure for updating the approximation can be defined on each dimension.

If the previous probability distribution function is denoted $\hat{p}_{old}(x)$ and the updated probability distribution function is denoted $\hat{p}_{new}(x)$, a measurement of change of the probability distribution function can be defined as follows.

$$\rho = \frac{\int (\hat{p}_{old}(x) - \hat{p}_{new}(x))^2 dx}{\int \hat{p}_{old}(x)^2 dx} \quad (13)$$

The approximation for a dimension is updated when $\rho$ is bigger than a predetermined threshold value.

An experiment was performed for evaluating an image database having 34,698 aerial photograph images. First, 48-dimensional feature vectors describing texture characteristics of each of the images were extracted using a predetermined method for extracting texture features. A probability distribution function was estimated from an entire data set on the basis of the extracted feature vector.

Figure 5A:
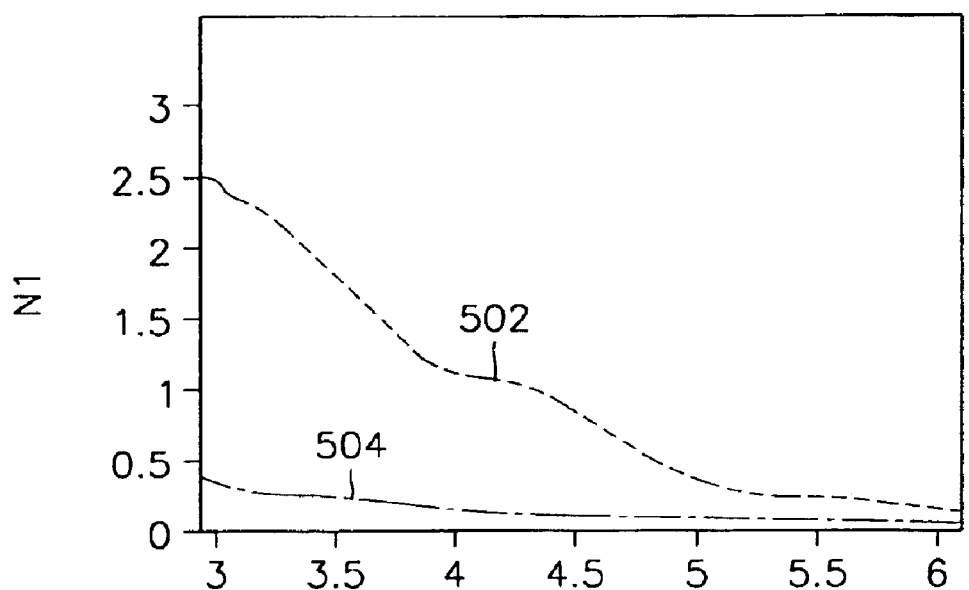
FIGS. 5A and 5B are graphs showing the comparison of the number of feature vectors visited in first and second filtering steps, using a conventional indexing method and an indexing method of the present invention.
Figure 5B:
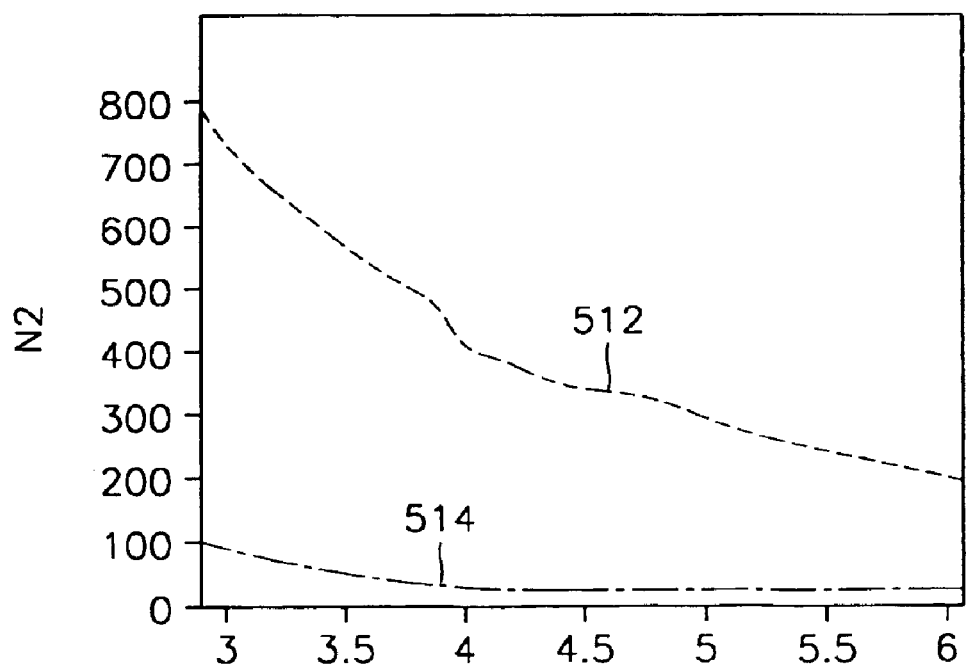

FIGS. 5A and 5B show a comparison of the number of feature vectors which visit in the first step filtering and the second step filtering, using the conventional indexing method and the indexing method of the present invention.

In FIG. 5A, a graph 502 shows the number of feature vectors which visit in the first filtering step using the indexing method of the present invention which adaptively forms VA files, and a graph 504 shows the number of feature vectors which visit in the first step filtering using the conventional indexing method which uses fixed VA files. The number of feature vectors which visit in the first step filtering is also indicated as a vertical axis of N1.

In FIG. 5B, a graph 512 shows the number of feature vectors which visit in the second filtering step using the indexing method of the present invention which adaptively forms VA files, and a graph 514 shows the number of feature vectors which visit in the second step filtering using the conventional indexing method which uses fixed VA files. The number of feature vectors which visit in the second step filtering is also indicated as a vertical axis of N2.

Comparing graphs 502 and 504 with the graphs 512 and 514, the number of feature vectors, which visit in the first step filtering and the second step filtering using the indexing method of the present invention which forms adaptively VA files, is much larger than the number of feature vectors which visit in the first step filtering and the second step filtering using the conventional indexing method which uses fixed VA files.

The indexing method of the present invention may be written as a program which is performed in a personal computer or a server computer. Program codes and code segments which form the program can be easily derived by computer programmers in the art. Also, the program can be stored in computer readable recording media. The recording media includes magnetic recording media, optical recording media, and carrier wave media.

While a specific embodiment of the invention has been shown and described in detail, it will be understood that the invention may be modified without departing from the spirit of the inventive principles as set forth in the hereafter appended claims.

What is claimed is:

1. A computer-implemented method for indexing feature vector data space comprising the step of:
   (a) adaptively approximating feature vectors on the basis of statistical distribution of feature vector data in the feature vector data space, wherein the step (a) further comprises the steps of:
   (a-1) measuring the statistical distribution of the feature vector data in the feature vector data space;
   (a-2) estimating marginal distribution of the feature vector data using the statistical distribution;
   (a-3) dividing the estimated marginal distribution into a plurality of grids in which a probability of disposing the feature vector data in each grid is uniform; and
   (a-4) indexing the feature vector data space using the divided grids.

2. The method of claim 1, further comprising prior to step (a-4), the step of updating the grids on the basis of a previous probability distribution function and an updated probability distribution function, when new data is received.

3. The method of claim 1, wherein step (a-4) further comprises indexing using vector approximation (VA) files.

4. The method of claim 1, wherein a number of the plurality of grids is determined by a number of bits assigned to the dimension.

5. The method of claim 1, wherein step (a-2) further comprises the steps of:
   (a-2-1) defining a probability distribution function using a weighted sum of a predetermined distribution function; and
   (a-2-2) obtaining an estimated probability distribution function by estimating predetermined parameters using the probability distribution function defined in the step (a-2-1).

6. The method of claim 5, wherein step (a-2-2) further comprises obtaining the estimated probability distribution function by estimating the predetermined parameters using all N predetermined data in each estimation, wherein N is a positive integer, on the basis of an expectation-maximization algorithm using the probability distribution function defined in the step (a-2-1).

7. The method of claim 5, wherein the predetermined distribution function is the Gaussian function.

8. The method of claim 5, wherein the probability distribution function of step (a-2-1) is a one-dimensional signal, p(x), wherein $$p(x) = \sum_{j=1}^{N} p(x|j)P(j),$$

and wherein p(x|j) is defined as $$p(x|j) = \frac{1}{\sqrt{2\pi\sigma^2}} \exp\left\{-\frac{(x-\mu_i)^2}{2\sigma_i^2}\right\},$$

wherein coefficient P(j) is a mixing parameter that satisfies the following criterion $$0 \le P(j) \le 1 \text{ and } \sum_{j=1}^{M} P(j) = 1.$$

9. The method of claim 5, wherein the estimated probability distribution function of step (a-2-2) is obtained by finding $\phi_j$, j=1, ..., M, which maximizes $$\Phi(\Phi_1, \ldots, \Phi_M) = \prod_{l=0}^{N} p(v[l]|(\Phi_1, \ldots, \Phi_M)),$$

where parameters v[l], l=1, ..., N, is a given data set.

10. The method of claim 9, wherein the estimated parameters of step (a-2-2) are updated according to the following equations $$\mu_j^{t+1} = \frac{\sum_{l=1}^{N} (p(j|v[l]))^t v[l]}{\sum_{l=1}^{N} (p(j|v[l]))^t},$$

$$(\sigma_j^2)^{t+1} = \frac{\sum_{l=1}^{N} p(j|v[l])^t (v[l] - \mu_j^t)^2}{\sum_{l=1}^{N} p(j|v[l])^t}, \text{ and}$$

$$P(j)^{t+1} = \frac{1}{N} \sum_{l=1}^{N} p(j|v[l])^t,$$

wherein t is a positive integer representing a number of iterations.

11. The method of claim 10, the estimated parameter set of step (a-2-2) using N data v[1] is given as $\{P(j)^N \mu_j^N, (\sigma_j^2)^N\}$, and the updated parameter set for new data v[N+1], coming in, is calculating using the following equations:

$$\mu_j^{N+1} = \mu_j^N + \theta_j^{N+1}(v[N+1] - \mu_j^N),$$

$$(\sigma_j^2)^{N+1} = (\sigma_j^2)^N + \theta_j^{N+1}\left[(v[N+1] - \mu_j^N)^2 - (\sigma_j^2)^N\right],$$

$$P(j)^{N+1} = P(j)^N + \frac{1}{N+1}(P(j|v[N+1]) - P(j)^N), \text{ and}$$

$$(\theta_j^{N+1})^{-1} = \frac{P(j|v[N])}{P(j|v[N+1])}(\theta_j^N)^{-1} + 1.$$

12. The method of claim 10, wherein the step (a-2-2) further comprises:

measuring a change of a probability distribution function which is defined as $$\rho = \frac{\int (\hat{p}_{old}(x) - \hat{p}_{new}(x))^2 dx}{\int (\hat{p}_{old}(x))^2 dx}$$

for each dimension, wherein a previous probability distribution function is $\hat{P}_{old}(x)$, and an updated probability distribution function is $\hat{P}_{new}(x)$; and updating an approximation for the dimension if ρ is larger than a predetermined threshold value.

13. The method of claim 1, wherein step (a-3) further comprises dividing a probability distribution function into the plurality of grids to make areas covered by each grid equal, wherein the plurality of grids have boundary points defined by c[l], l=0, ..., $2^b$, where b is a number of bits allocated and wherein the boundary points satisfy a criterion, $$\int_{c[l]}^{c[l+1]} \hat{p}(x) dx = \frac{1}{2^b} \int_{c[0]}^{c[2b]} \hat{p}(x) dx,$$

and wherein the estimated probability distribution function is $\hat{p}(x)$.

14. The method of claim 1, wherein the feature vector data space is in a plurality of dimensions and the feature vector data is in one dimension.

15. The method of claim 1, wherein the feature vector data space is in a plurality of dimensions and the feature vector data is in one dimension.

* * * * *